United States Patent
Muegge et al.

(10) Patent No.: US 6,862,198 B2
(45) Date of Patent: *Mar. 1, 2005

(54) PWM POWER CONVERTER WITH DIGITAL SAMPLING CONTROL CIRCUITRY

(75) Inventors: Mark R. Muegge, Cupertino, CA (US); Mark Eason, Hollister, CA (US); Mark D. Telefus, Orinda, CA (US)

(73) Assignee: iWatt, Inc., Los Gatos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/306,728

(22) Filed: Nov. 27, 2002

(65) Prior Publication Data

US 2004/0037094 A1 Feb. 26, 2004

Related U.S. Application Data

(60) Provisional application No. 60/335,723, filed on Nov. 29, 2001.

(51) Int. Cl.⁷ .............................................. H02M 3/335
(52) U.S. Cl. ................ 363/21.11; 363/21.18; 323/222; 323/283
(58) Field of Search ................. 323/222, 282, 323/283; 363/21.04, 21.05, 21.08, 21.1, 21.11, 21.12, 21.13, 21.16, 21.18, 97

(56) References Cited

U.S. PATENT DOCUMENTS

| | | | |
|---|---|---|---|
| 4,589,051 A | 5/1986 | Santurtun et al. | |
| 4,597,026 A | 6/1986 | Santurtun et al. | |
| 4,819,144 A | 4/1989 | Otake | |
| 4,975,820 A | 12/1990 | Szepesi | |
| 5,028,861 A | 7/1991 | Pace et al. | |
| 5,146,398 A | 9/1992 | Vila-Maso et al. | |
| 5,189,599 A | 2/1993 | Messman | |
| 5,272,614 A | * 12/1993 | Brunk et al. | 363/21.05 |
| 5,276,604 A | 1/1994 | Messman | |
| 5,285,366 A | 2/1994 | Zaretsky | |
| 5,313,381 A | 5/1994 | Balakrishnan | |
| 5,438,499 A | 8/1995 | Bonte et al. | 363/21 |
| 5,479,090 A | 12/1995 | Schultz | |
| 5,565,761 A | 10/1996 | Hwang | |
| 5,570,276 A | 10/1996 | Cuk et al. | |
| 5,629,841 A | 5/1997 | Attwood | |
| 5,680,034 A | 10/1997 | Redl | |
| 5,747,977 A | 5/1998 | Hwang | |
| 5,764,039 A | 6/1998 | Choi et al. | |
| 5,804,950 A | 9/1998 | Hwang et al. | |
| 5,815,380 A | 9/1998 | Cuk et al. | |
| 5,822,200 A | 10/1998 | Stasz | |
| 5,828,558 A | 10/1998 | Korcharz et al. | |

(List continued on next page.)

FOREIGN PATENT DOCUMENTS

| | | |
|---|---|---|
| EP | 841740 A2 | 5/1998 |
| EP | 841740 A1 | 5/1998 |
| EP | 942518 A3 | 9/1999 |
| EP | 942518 A2 | 9/1999 |
| WO | WO 98/44622 | 10/1998 |

OTHER PUBLICATIONS

TNY253/254/255, *TinySwitch* ™ Family, Energy Efficient, Low Power Off–Line Switchers, Power Integrations, Inc. Feb. 1999, pp. 1–16.

*Primary Examiner*—Jeffrey Sterrett
(74) *Attorney, Agent, or Firm*—Fenwick & West LLP

(57) ABSTRACT

Switching power converters for regulating voltage at an output of a load include digital control circuitry for sensing an output voltage feedback signal, comparing the sensed feedback signal to a reference at a determined time during a cycling of the switch; and regulating the output voltage by either enabling or inhibiting cycling of a switch by a cycle of a drive signal produced by pulse generation circuitry in response to the comparison.

10 Claims, 14 Drawing Sheets

U.S. PATENT DOCUMENTS

| | | | |
|---|---|---|---|
| 5,831,418 A | 11/1998 | Kitagawa | |
| 5,841,643 A | 11/1998 | Schenkel | |
| 5,862,045 A | 1/1999 | Halamik et al. | |
| 5,886,586 A | 3/1999 | Lai et al. | |
| 5,886,885 A | 3/1999 | Fujie | |
| 5,932,938 A | 8/1999 | Shimamori | |
| 5,949,229 A | 9/1999 | Chol et al. | |
| 6,020,729 A * | 2/2000 | Stratakos et al. | 323/283 |
| 6,049,471 A | 4/2000 | Korcharz et al. | |
| 6,087,816 A | 7/2000 | Volk | |
| 6,115,274 A | 9/2000 | Mao | |
| 6,181,583 B1 | 1/2001 | Okui et al. | |
| 6,208,528 B1 | 3/2001 | Soto et al. | |
| 6,246,220 B1 * | 6/2001 | Isham et al. | 323/224 |
| 6,275,018 B1 | 8/2001 | Telefus et al. | |
| 6,304,473 B1 | 10/2001 | Telefus et al. | |
| 6,307,356 B1 * | 10/2001 | Dwelley | 323/282 |
| 6,396,250 B1 * | 5/2002 | Bridge | 323/283 |
| 6,597,159 B2 * | 7/2003 | Yang | 323/283 |

* cited by examiner

| High/Low Detector Output = | $T_{ON}(n+1)=$ | | |
|---|---|---|---|
| | $T_{ON}(n)=T_{MIN}$ | $T_{MIN}<T_{ON}(n)<T_{MAX}$ | $T_{ON}(n)=T_{MAX}$ |
| Low | $T_{MIN}+T_{DELTA}$ | Smaller of $T_{ON}(n)+T_{DELTA}$ and $T_{MAX}$ | $T_{MAX}$ |
| High | $T_{MIN}$ | Larger of $T_{ON}(n)+T_{DELTA}$ and $T_{MIN}$ | $T_{MAX}-T_{DELTA}$ |

| Early/Late Detector Output = | $T_{ON}(n+1)=$ | | |
|---|---|---|---|
| | $T_{ON}(n)=T_{MIN}$ | $T_{MIN}<T_{ON}(n)<T_{MAX}$ | $T_{ON}(n)=T_{MAX}$ |
| Early | $T_{MIN}+T_{DELTA}$ | Smaller of $T_{ON}(n)+T_{DELTA}$ and $T_{MAX}$ | $T_{MAX}$ |
| Neither | $T_{MIN}$ | $T_{ON}(n)$ | $T_{MAX}$ |
| Late | $T_{MIN}$ | Larger of $T_{ON}(n)+T_{DELTA}$ and $T_{MIN}$ | $T_{MAX}-T_{DELTA}$ |

| Early/Late Detector Output = | $T_{ON}(n+1)=$ | | |
|---|---|---|---|
| | $T_{ON}(n)=T_{MIN}$ | $T_{MIN}<T_{ON}(n)<T_{MAX}$ | $T_{ON}(n)=T_{MAX}$ |
| Early | Smaller of $T_{MIN}+kT_{E/L}$ and $T_{MAX}$ | Smaller of $T_{ON}(n)+kT_{E/L}$ and $T_{MAX}$ | $T_{MAX}$ |
| Late | $T_{MIN}$ | Larger of $T_{ON}(n)-kT_{E/L}$ and $T_{MIN}$ | Larger of $T_{MAX}-kT_{E/L}$ and $T_{MIN}$ |

PWM POWER CONVERTER WITH DIGITAL SAMPLING CONTROL CIRCUITRY

RELATED APPLICATION DATA

This application claims priority to provisional application Ser. No. 60/335,723, filed Nov. 29, 2001, which is fully incorporated herein by reference.

FIELD OF INVENTION

The invention pertains generally to the field of power conversion and more particularly to methods of controlling power converters.

BACKGROUND

Switching power converters offer both compactness and efficiency in a number of different topologies that can be placed in two main categories: isolated (or transformer-coupled) and non-isolated (or direct-coupled). In non-isolated switching power converters, such as a buck (reducing voltage) or boost (increasing voltage) converter, the power output is directly coupled to the power input through the power switch element. In contrast, in isolated power converters, such as flyback or forward converters, the power output is isolated from the power input through a transformer, with the power switch element located on the primary (input) side of the transformer.

The regulation of the output voltage of switching power converters (whether isolated or non-isolated) is generally accomplished by sensing the difference between an output voltage feedback signal approximating the output voltage at the load, and a reference, and using this difference, or error voltage, to determine how to cycle the switch so as to minimize the difference between the output voltage feedback signal and the reference. In this context, regulation schemes can be divided into two classes: pulse modulating schemes and pulse gating schemes.

With pulse modulating schemes, the error voltage is used to form a pulse which will cycle the switch in such a way as to drive the output voltage signal onto the reference; whereas with pulse gating schemes, the error voltage is not used to form a specific pulse, but instead is used to gate pre-formed pulses (from a pulse generator) to the switch to drive the output voltage feedback signal toward the reference.

Examples of a pulse gating schemes are disclosed and described in application Ser. No. 09/970,849, filed Oct. 3, 2001, which is a continuation-in-part of application Ser. No. 09/279,949, filed Oct. 4, 2000, now U.S. Pat. No. 6,304,473, which is a continuation-in-part of application Ser. No. 09/585,928, filed Jun. 2, 2000, now U.S. Pat. No. 6,275,018, each of which is fully incorporated herein by reference. Pulse width modulation (PWM), pulse frequency modulation (PFM), or combinations of PWM and PFM form the basis of most pulse modulating schemes.

Consider, for example, the flyback converter 10 of FIG. 1. The converter 10 includes a power switch Q1 (typically a field effect transistor (FET)) coupled to an input voltage, $V_{in}$, via a primary winding 20 of a power transformer T1. A rectifying diode D1 and filter capacitor C1 are coupled to a secondary winding 22 of the transformer T1. The converter 10 includes a pulse modulating controller 25 that outputs a drive signal 61 to turn ON the power switch Q1 in order to control an output voltage, $V_{out}$, across a load 24. A primary/secondary isolation circuit 30 provides an output voltage feedback signal that approximates the output voltage across load 24. An error voltage sense circuit 31 generates an error voltage from inputs that include a reference voltage, $V_{REF}$, as well as the output voltage feedback signal from primary/secondary isolation circuit 30. This error voltage is used by the controller 25 for regulating the ON time of the power switch Q1.

Obtaining the output voltage feedback signal from the secondary side of the converter, as shown in FIG. 1, offers the potential of accurate regulation performance, but necessarily increases the complexity and cost of the control system. If a primary-side feedback system were used instead, the output voltage feedback signal would be obtained from the primary side of power transformer T1, reducing cost and complexity of the control system, but introducing difficulties with regulation accuracy.

In a primary-side feedback system, the output voltage feedback signal would be obtained from the primary side of power transformer T1, preferably via an auxiliary winding, as shown in FIG. 2. FIG. 2 illustrates a flyback converter 15, which is similar to converter 10 of FIG. 1, except that the reflected output voltage feedback signal is obtained from a primary-side an auxiliary winding 40, instead of from the primary/secondary isolation circuit 30. In particular, the voltage, $V_{AUX}$, across the auxiliary winding 40 is proportional to the output voltage $V_{out}$ across the load 24 minus a voltage drop produced by resistive and other losses in the secondary circuit, including losses across the rectifying diode D1. These losses will vary, depending upon the current drawn by the load and other factors. Hence, measuring the output voltage $V_{out}$ through the reflected flyback voltage is problematic, as parasitic losses act as a corrupting signal that cannot be removed by filtering. As such, prior art primary-side feedback systems, such as that disclosed in U.S. Pat. No. 5,438,499, which depends upon the reflected voltage, are challenged to provide good voltage regulation.

Accordingly, there is a need in the art for power converters having primary-only feedback that achieves regulation performance traditionally obtainable with secondary feedback, while preserving the intended simplicity and cost benefits of primary-only feedback.

SUMMARY OF ASPECTS OF THE INVENTION

In accordance with one aspect of the invention, power converters for delivering power from a source to a load, are provided with digital sampling control circuitry. In one embodiment, a converter includes a switch, pulse modulating controller producing power pulses for cycling the switch ON and OFF, wherein if a switch is cycled ON and OFF according to a cycle of a power pulse, power is transferred from the source to the load and a comparator for comparing an output voltage feedback signal to a reference the control circuitry controls the turn ON and turn OFF times of the switch in response to an output of the comparator, the controller sampling the comparator output at one or more determined times during a cycling of the switch.

In embodiments of the invention, the comparator may be a binary comparator, a ternary comparator, or a signed digital comparator.

In certain embodiments, the controller takes into account comparator outputs from one or more previous switch cycles in determining the turn ON and turn OFF times of the switch in response to a present comparator output.

In preferred embodiments, the determined sample times are determined for each cycling of the switch. In one embodiment, a determined sample time is an instant at which the output voltage feedback signal corresponds to the output voltage plus a small, substantially constant voltage drop measured from cycle to cycle of the switch. In one embodiment, a determined sample time is an instant at which current flowing through the rectifying element is small and substantially constant from cycle to cycle of the switch.

In one embodiment, the converter is a flyback converter having a transformer flux reset point, the output voltage feedback signal is a reflected flyback voltage signal, and one determined sample time is a fixed backward offset time from the transformer flux reset point. In flyback embodiments, transformer flux reset point may be determined using a measured or calculated value of the period of resonant oscillation of the reflected flyback voltage signal, using a point at which the voltage across an auxiliary transformer winding is approximately zero, or using a point at which the voltage across the primary winding of the power transformer is approximately zero.

In one embodiment, the converter is a forward converter having an output inductor, the output voltage feedback signal is a reflected voltage across an auxiliary winding coupled to the output inductor, and one determined sample time is a fixed backward offset time from a point of output inductor flux reset.

In one embodiment, the converter is a direct-coupled boost converter, the output voltage feedback signal corresponds to a voltage across the switch during its OFF time, and one determined sample time is an instant at which current through a rectifying element is small and substantially constant from cycle to cycle of the switch.

In one embodiment, the converter is a direct-coupled buck converter, the output voltage feedback signal corresponds to a differential voltage across an output inductor during the OFF time of the switch, and one determined sample time is an instant at which current through a rectifying element is small and substantially constant from cycle to cycle of the switch.

Other and further aspects and embodiments of the invention will become apparent upon review of the accompanying figures and the following detailed description.

BRIEF DESCRIPTION OF THE DRAWINGS

The various aspects and features of the invention will be better understood by examining the figures, in which similar elements in different embodiments are given the same reference numbers for ease in illustration, and in which.

DETAILED DESCRIPTION

It will be apparent to those skilled in the art that the power converter control system methodologies and embodiments disclosed and described herein may be applied to transformer-coupled switching converters, such as a flyback, forward, fly-forward, push-pull, or bridge-type power converters. In addition, as will be explained herein, direct-coupled switching power converters such as buck, boost, buck/boost or SEPIC power converters may also benefit from these control methodologies and embodiments.

The above-incorporated U.S. Pat. No. 6,275,018 discloses and describes various embodiments of a "pulse rate" (also referred to as "pulse train") method of power converter regulation. Notably, pulse rate regulation, in itself, controls neither the ON TIME nor the OFF TIME of the power switch in order to regulate the output voltage. Instead, output regulation may be accomplished by controlling the rate of independently specified activation pulses presented to the power switch. If the load requires more power, pulses from a pulse generator are allowed to cycle the power switch. Otherwise, pulses from the pulse generator are inhibited from cycling the power switch.

Control circuitry for and methods for obtaining accurate, real-time primary-only feedback are disclosed and described in the above-incorporated U.S. patents and applications, and are further refined upon herein. These primary-only circuits and methods may also be applied to power converters regulated using PWM and PFM controllers, as disclosed and described below.

More particularly, prior art PWM and PFM controllers endeavor to construct pulses that will drive the output voltage onto the reference. In this case, owing to practical limits on the width and frequency of pulses, in the presence of a fixed load, the output voltage will "ripple" about the reference. Because pulse rate control parameters (i.e., phase, width, and frequency) are specified independently of regulation, pulse rate regulation presents the opportunity to realize numerous power stage optimizations obtained at the price of exchanging "ripples" for "limit cycles." Compared to secondary feedback, with its costly opto-isolator circuit and attendant demands on circuit board-layout, primary-only feedback offers the potential of cheaper, slimmer power supplies for applications such as consumer electronics.

Figure 1:
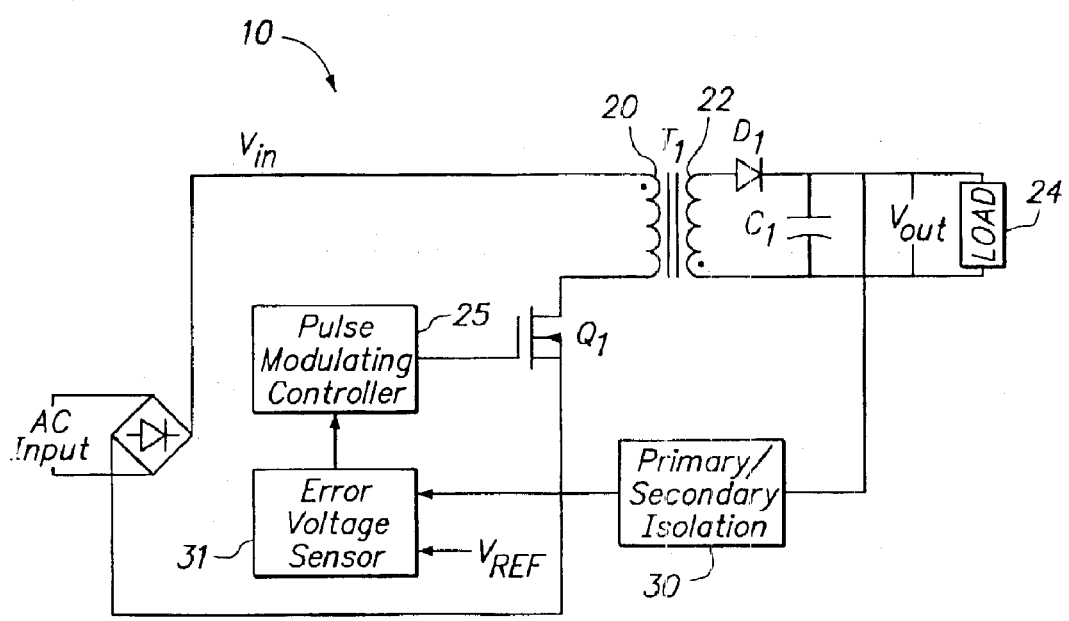
FIG. 1 is a flyback converter with a pulse modulating controller having prior art secondary-side feedback.
Figure 2:
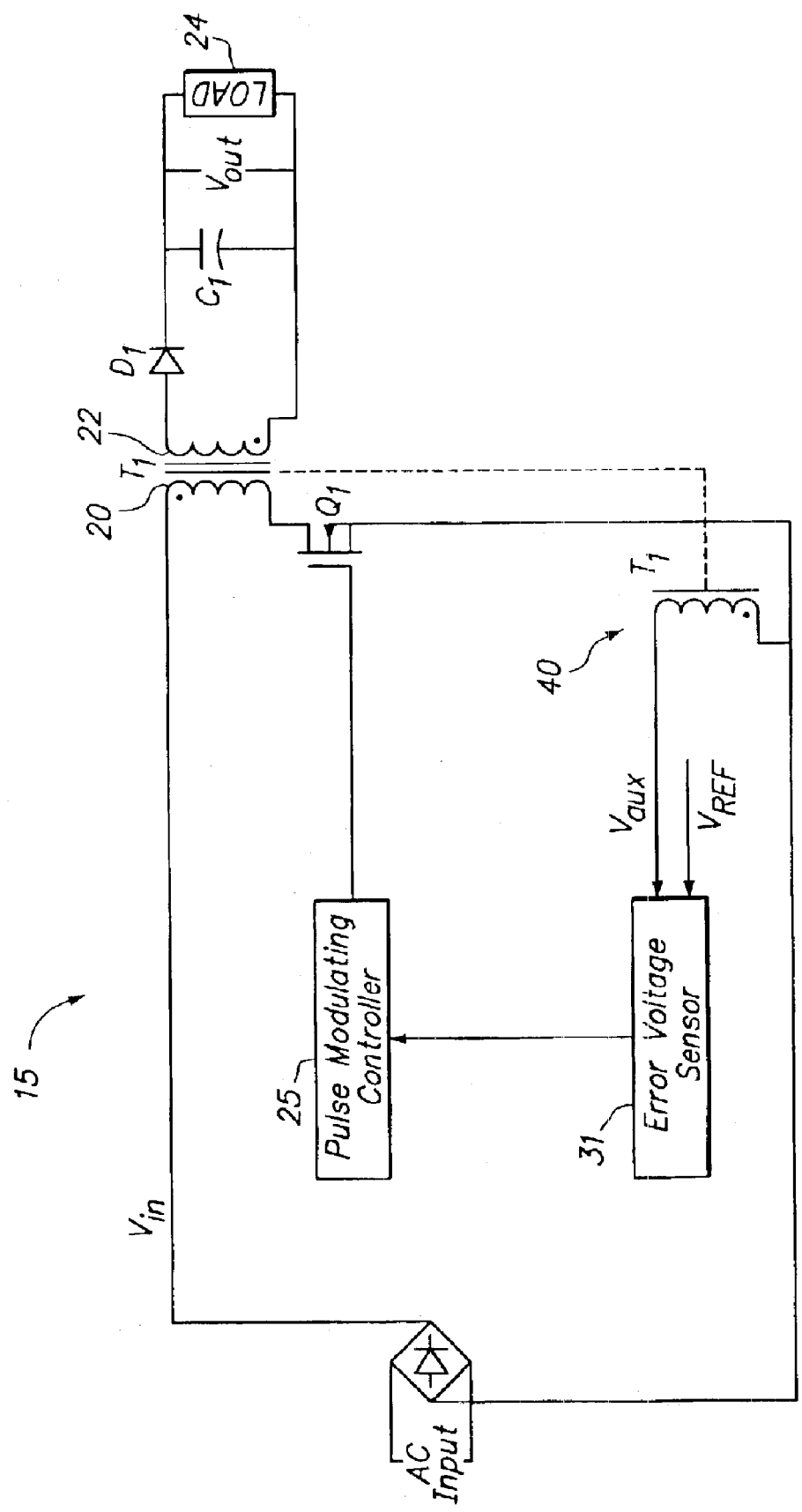
FIG. 2 is a flyback converter with a pulse modulating controller having prior art primary-side feedback.
Figure 3:
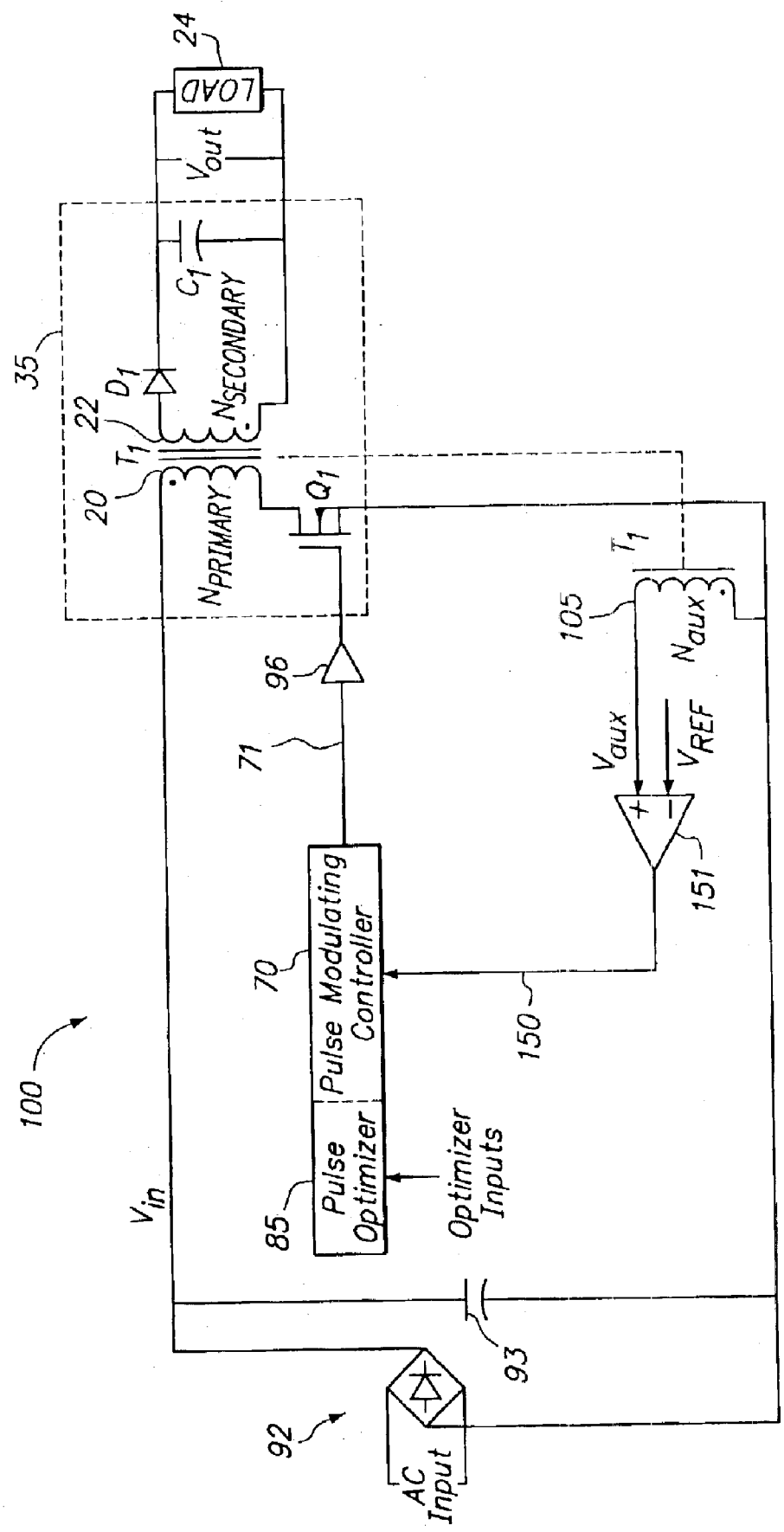
FIG. 3 is a flyback converter with a pulse modulating controller having primary-only feedback according to one embodiment of the invention.

FIG. 3 illustrates a flyback power converter 100 employing primary-only feedback for regulation purposes. The converter 100 includes a power stage 35, which comprises a transformer T1 having a primary winding 20 and secondary winding 22, rectifying diode D1 and filter capacitor C1.

Power stage 35 receives an input voltage, $V_{in}$, produced by a rectifier 92 operating on an AC line input. A capacitor 93 helps smooth voltage ripple on $V_{in}$. A pulse modulating controller 70 produces a power pulse drive signal 71 that cycles switch Q1 based on an output voltage feedback signal 150. As illustrated, switch Q1 may be a power MOSFET. Alternatively, switch Q1 may comprise multiple transistors or other suitable means.

To regulate $V_{out}$, pulse modulating controller 70 controls the ON TIME (the time between switch ON and switch OFF) and the OFF TIME (the time between switch OFF and switch ON) through drive signal 71 that cycles switch Q1. (Driver 96 amplifies drive signal 71 to effect the turn ON and turn OFF of switch Q1.) Where controller 70 implements fixed frequency pulse width modulation (PWM), the switch ON TIME will vary between a minimum power pulse width (corresponding to the minimum duty cycle) and a maximum power pulse width (corresponding to the maximum duty cycle).

The switch OFF TIME will be the difference between the switch cycle period and the ON TIME. Where controller 70 implements fixed ON TIME pulse frequency modulation (PFM), the switch OFF TIME will vary between a minimum value (corresponding to the maximum duty cycle) and a maximum value (corresponding to the minimum duty cycle). Where controller 70 implements some combination of PWM and PFM, the switch ON TIME and OFF TIME may be determined, in part, by operating conditions, such as the power being transferred to load 24.

The pulse modulating controller 70 may or may not keep history; that is it may or may not remember the results of previous comparisons. If controller 70 keeps history, it may reference said history in the process of determining the ON TIME and OFF TIME of switch Q1. Moreover, the precise instants in time when transistor Q1 switches ON and OFF may further be controlled by a pulse optimizer 85, as disclosed and described in the above-incorporated patents and applications, and described further herein.

The flyback power converter 100 implements a method of primary-only feedback in the following fashion. When switch Q1 is switched OFF following the ON time of a power pulse, the voltage on the secondary winding 22 will be "reflected" back onto the primary winding 20 scaled by the turns ratio, $N_P/N_S$, where $N_P$ is the number of turns on the primary winding 20 and $N_S$ is the number or turns on the secondary winding 22.

Although the voltage across the primary winding 20 could be sensed to perform primary-only feedback control, a more suitable signal for sensing may be provided through the use of an auxiliary winding 105, as the voltage on this winding 105 is ground referenced. The reflected voltage, $V_{AUX}$, on auxiliary winding 105 will be $N_{AUX}/N_S$ times the voltage on secondary winding 22, where $N_{AUX}$ is the number of turns on auxiliary winding 105, and $N_S$ is the turns on secondary winding 22. The relationship between $V_{AUX}$ and $V_{out}$ is given by the expression $$V_{AUX}=(V_{out}+\Delta V)N_{AUX}/N_S \qquad (1)$$

where $\Delta V$ is the voltage drop caused by resistive and other losses in the secondary circuit. This voltage drop includes, in particular, losses across rectifying diode D1.

One aspect of the present invention leverages the notion that by sampling $V_{AUX}$ at precisely determined instants for which the term $\Delta V$ is small and approximately constant from sample to sample, real-time output voltage feedback can be obtained, where "real-time" output voltage feedback denotes an unfiltered output voltage measurement taken after each power pulse and available to the control logic for the selection of the succeeding drive signal.

A comparator 151 produces an output voltage feedback signal 150 by comparing the $V_{AUX}$ waveform to a reference voltage, $V_{REF}$, calibrated to compensate for the average value of $\Delta V$ at those precisely determined instants when $\Delta V$ is small and substantially constant from cycle to cycle. For example, the reference may be derived from a bandgap voltage reference or other suitable means, such as a compensated zener diode to provide a reliably stable reference voltage. By this calibration of $V_{REF}$, those precisely determined instants define not only the instants at which accurate, real-time output voltage feedback is available, but also the instants at which $V_{AUX}$ and $V_{REF}$ are expected to crossover, resulting in a transition or state change in the output voltage feedback signal 150.

Comparator 151 employed to generate feedback signal 150 can be more or less sophisticated, depending on the amount of information required to insure acceptable regulation. Perhaps the simplest of comparators is the binary comparator, with or without hysteresis, which indicates $V_{AUX}$ is high or low, relative to $V_{REF}$. Slightly more sophisticated is the ternary comparator, which indicates high or low or neither, when the magnitude of the difference between $V_{AUX}$ and $V_{REF}$ is less than some fixed voltage.

Figure 10:
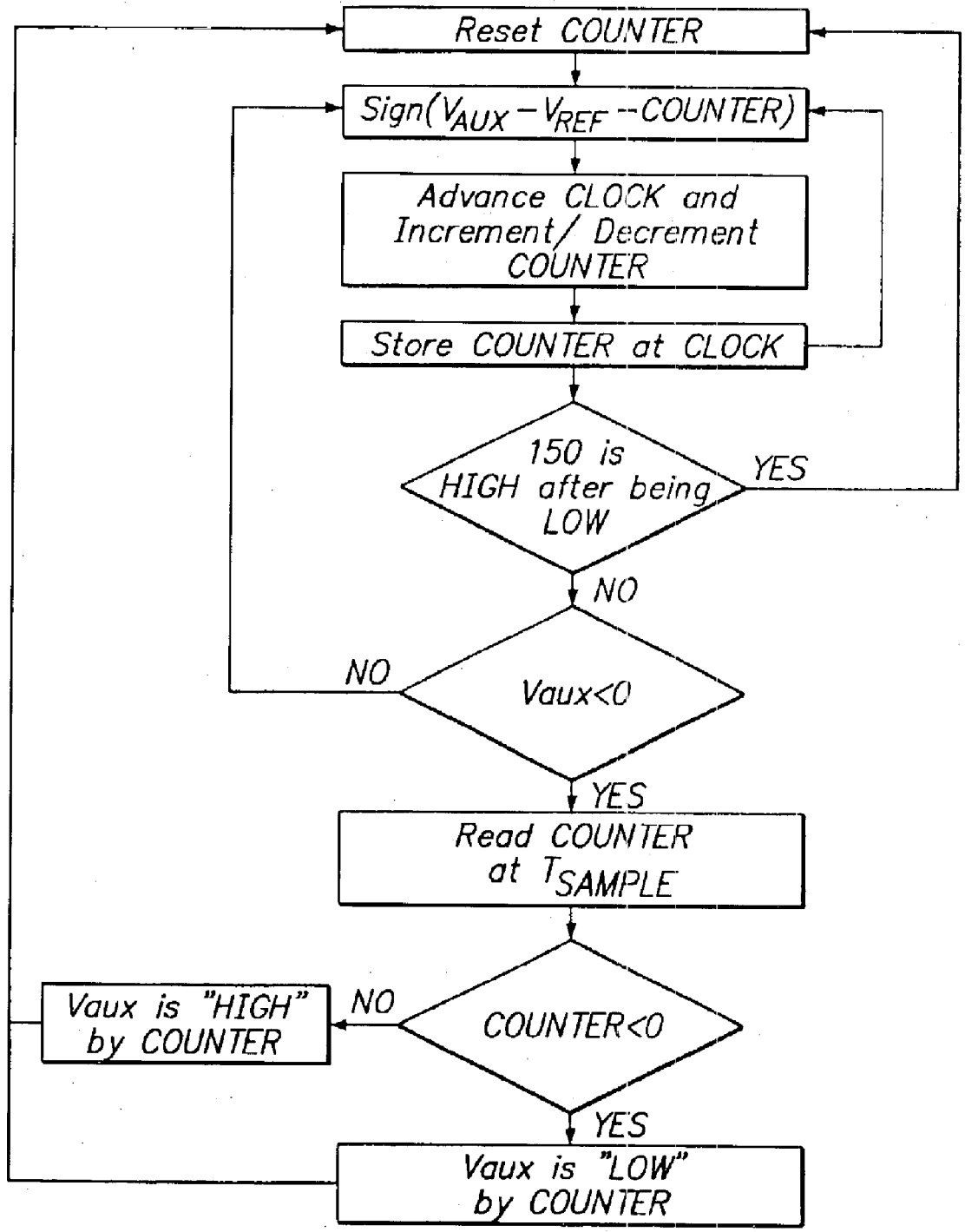
FIG. 10 is a logical flowchart of a signed digital comparator employed in embodiments of the invention.

A still more sophisticated comparator is a signed digital comparator, which provides a high or low indication and, in addition, the magnitude of the difference expressed digitally. FIG. 10 details one embodiment of a signed digital comparator implemented with binary comparators, counters, a digital-to-analog converter, a subtractor, and a minimal amount of control logic, obviating the need for an error amplifier and the sample and hold circuitry characteristic of prior art analog systems. In the example of FIG. 10, under the condition in which $V_{AUX}$ equals $V_{REF}$ at precisely $T_{SAMPLE}$, the comparator may indicate "high" by zero units of voltage. In the embodiments discussed herein, binary comparators without hysteresis are assumed.

Figure 4:
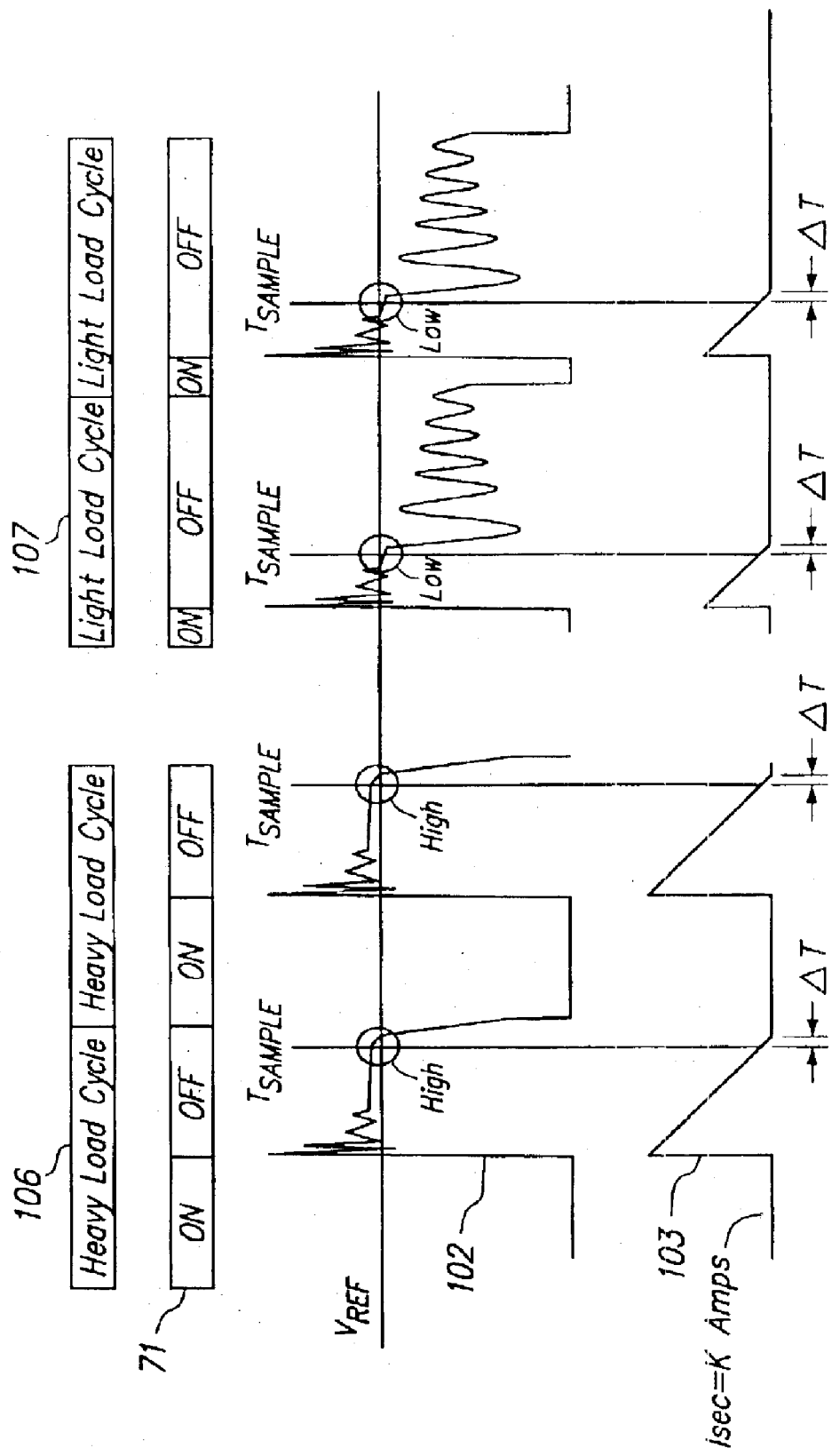
FIGS. 4 and 5 are timing diagrams illustrating a primary-only feedback sampling technique according to embodiments of the invention.
Figure 5:
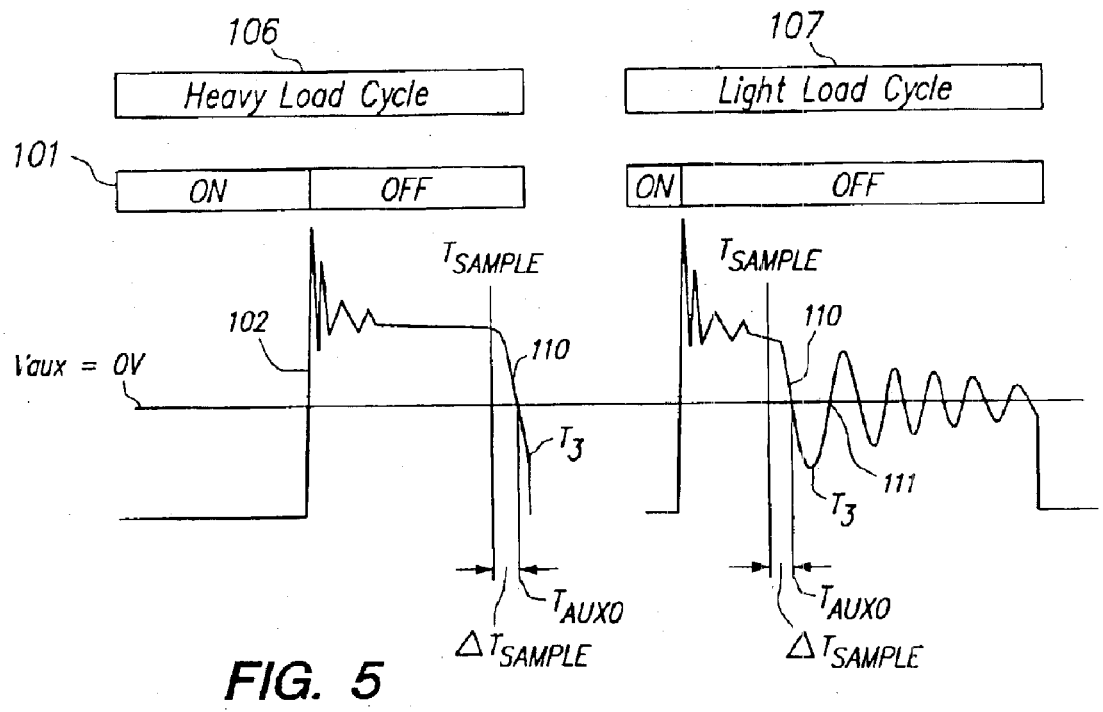

The sampling timing diagrams of FIG. 4 and FIG. 5 illustrate timing for both a "maximum" power pulse 106 and a "minimum" power pulse 107 generated by the pulse modulating controller 70 in converter 100. Shown are the following waveforms: a) the drive signal 71 to transistor switch Q1, b) the auxiliary voltage waveform 102, and c) the secondary current $I_{SEC}$ waveform 103 through the rectifying diode D1.

For both the maximum pulse 106 and minimum pulse 107, the reflected auxiliary voltage waveform 102 swings high when drive signal 101 switches transistor Q1 from ON to OFF. Similarly, $I_{SEC}$ 103 will also jump from a substantially zero current to a relatively high current value, $I_{PEAK}$, when drive signal 101 switches transistor Q1 from ON to OFF. During drive signal 101 OFF TIME, $I_{SEC}$ 103 will ramp down from this relatively high current value back to a substantially zero current value, assuming discontinuous or critically discontinuous operation. Sampling the binary output signal 150 at times when $I_{SEC}$=K Amps, where K=a small and constant value, will insure that the $\Delta V$ term in Equation (1) remains small and approximately constant from sample to sample.

To implement the foregoing, it suffices to sample binary output signal 150 at time $T_{SAMPLE}$, where $T_{SAMPLE}$ occurs at a fixed backward offset $\Delta T$ from the zero points of the secondary current $I_{SEC}$. This is because the current $I_{SEC}$ decays at the same rate regardless of the width of the preceding power pulse. Note that reflected voltage waveform 102 forms a "plateau" period of relatively constant voltage while $I_{SEC}$ 103 ramps down to zero current. As $I_{SEC}$ 103 reaches zero current, this plateau voltage drops off steeply. To get a good reading of the output voltage on load 24 by way of $V_{AUX}$, $T_{SAMPLE}$ should occur within the plateau period, as close to the drop off as possible. Hence ΔT cannot be made too small or sampling will be complicated by the collapse of the plateau, preventing a proper sensing of the output voltage.

To summarize, by sampling ΔT time ahead of the zero points of the secondary current, the ΔV term in equation (1) is maintained at a small and approximately constant value regardless of line or load conditions, enabling the potential for precise output regulation.

An alternative to direct sensing of the secondary current (an appropriate methodology for single-output converters) is the sensing of the transformer reset condition directly or indirectly. When $I_{SEC}$ 103 reaches zero the transformer T1 may be denoted to be in a reset condition. This reset condition occurs when the energy in the primary winding 20 has been completely transferred to the secondary winding 22. At such a point in time, the voltage across primary winding 20 will proceed to drop rapidly to zero.

Referring to FIG. 5, it can be seen that at reset, the voltage $V_{AUX}$ across the auxiliary winding 105 will also drop rapidly to (and through) zero volts, oscillating around zero until switch ON occurs. Thus, to detect a reset condition, a zero crossing comparator (not illustrated) could monitor $V_{AUX}$ and detect when it first equals zero following switch OFF. Alternatively, another comparator (not illustrated) could detect when $V_{IN}$ first equals the drain voltage on transistor Q1, $V_{DRN}$, which occurs when $V_{AUX}$ first equals zero. Because the time at which $V_{AUX}$ first equals zero ($T_{AUXO}$) lags transformer reset by a fixed amount of time, and it is more easily detected, it provides attractive means for indirectly measuring transformer reset time.

After the transformer has reached reset, there is still energy stored in the drain-source capacitance of transistor Q1. Assuming that transistor Q1 is not immediately cycled ON at this point, this energy then resonantly oscillates with the magnetizing inductance of the primary winding 22 at a resonant frequency determined by the capacitance and inductance values. The frequency (or period) of this resonance is substantially the same regardless of the width of the preceding power pulse.

The resonant oscillation of $V_{AUX}$ is illustrated in FIG. 4 and FIG. 5. With specific reference to FIG. 5, reflected auxiliary voltage waveform 102 will have a plateau period during the OFF TIME following a power pulse. A condition in which reflected auxiliary voltage 102 equals zero will occur following this plateau period at time 110. By measuring the time difference between the first zero crossing point of $V_{AUX}$ 110 following the turn OFF of switch Q1, and the second zero crossing point of $V_{AUX}$ 111, it is possible to empirically derive the period of resonant oscillation following flux reset. This empirically derived value of the resonant oscillation period is useful in fixing the setback from $T_{AUXO}$ to the transformer reset point (see below).

The reflected auxiliary voltage 102 achieves its first minimum at a time T3, which occurs midway between times 110 and 111. This first minimum voltage point, or a subsequent minimum, may be advantageously used as the point when the ON period for the next pulse begins. Because the voltage at the drain of transistor Q1 is also a minimum at time T3, the switching stresses and losses are minimized. Although the drain voltage is non-zero at time T3, it may be denoted as the zero-voltage switching time because this is as close to zero as the drain voltage will get.

As disclosed and discussed in the above-incorporated patents and applications, the pulse optimizer 85 accepts a variety of optimizer inputs, including $V_{AUX}$, and applies these inputs to derive the timing, etc., of power pulses, in order to realize optimizations such as zero-voltage switching. As the foregoing paragraphs suggest, an effective and easily-mechanized method for implementing zero-voltage switching is first, to detect the first and second zero-crossings of $V_{AUX}$ following the turn off of switch Q1; second, to derive the period of resonant oscillation; and third, to adjust power pulses to turn on at the first zero-crossing of $V_{AUX}$ ($T_{AUXO}$), plus ¼ of the resonant oscillation period, or $T_{AUXO}$ plus ¼ of the resonant oscillation period plus an integral multiple of resonant oscillation periods.

Where the foregoing method is used to implement zero-voltage switching, the time $T_{AUXO}$ and the period of resonant oscillation generated by pulse optimizer 85 can both be made available to pulse modulating controller 70 for use in the determination of $T_{SAMPLE}$. $T_{SAMPLE}$ could, for example, be determined from $T_{AUXO}$ by first subtracting ¼ of the resonant oscillation period (to "locate" the transformer reset point), and then subtracting ΔT. Having determined the sampling time, $T_{SAMPLE}$, controller 70 need only evaluate the binary output signal 150 of comparator 151 to determine whether at that instant $V_{AUX}$ is higher or lower than the expected value, $V_{REF}$.

If $V_{AUX}$ is greater than the reference voltage at the sample time $T_{SAMPLE}$, binary output signal 150 will be high; if $V_{AUX}$ is less than the reference voltage at $T_{SAMPLE}$, signal 150 will be low. A variety of control strategies may be employed to modulate pulse width or frequency based on binary output signal 150 at time-$T_{SAMPLE}$. These control strategies have as their primary objective, the determination of the duty cycle required to regulate the output voltage. Accordingly, they may be viewed as search strategies, exemplified by linear search, binary search, Newton-Raphson search, etc.

Figures 12A, 12B:
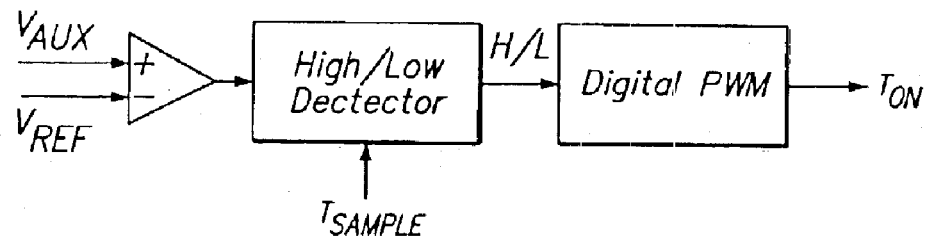
FIGS. 12A–B describe the operation of a pulse modulating controller implementing a high/low detector according to one embodiment of the invention.

FIGS. 12A–B illustrate a linear search strategy; the ON TIME of the nth pulse is denoted by $T_{ON}$(n). In response to sampling a high binary output signal 150 at $T_{SAMPLE}$, pulse modulating controller 70 narrows the next power pulse (relative to the previous power pulse) so as to reduce the power transferred to the load 24 to maintain regulation. The narrowing procedure amounts to decreasing the pulse width (relative to the width of the previous pulse) by a fixed increment, $T_{DELTA}$, subject to the minimum pulse width constraint. In response to sampling a low binary output signal 150 at $T_{SAMPLE}$, pulse modulating controller 70 widens the next power pulse (relative to the previous power pulse) so as to increase the power transferred to load 24 to maintain regulation. The widening procedure, in this case, amounts to increasing the pulse width (relative to the width of the previous pulse) by a fixed increment, $T_{DELTA}$, subject to the maximum pulse width constraint. In this fashion, the search converges on the value of $T_{ON}$ required for regulation, and the output voltage $V_{out}$ across load 24 will be determined through the value of $V_{REF}$.

Figure 5A:
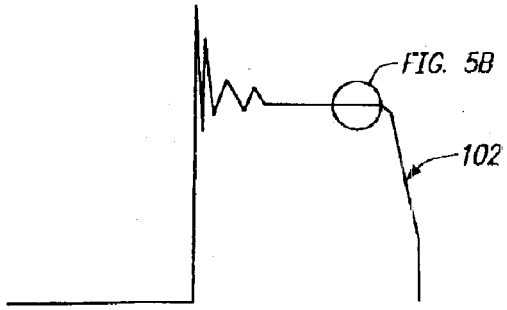
FIGS. 5A and 5B provide greater detail of aspects demonstrated in the timing diagrams in FIGS. 4 and 5.
Figure 5B:
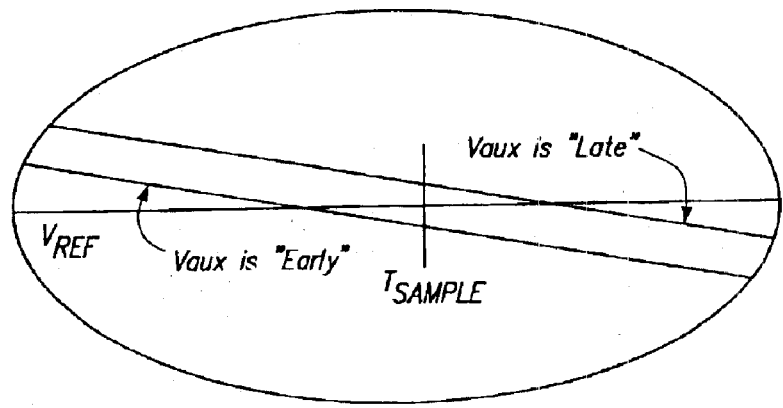

An alternative to sampling the binary output signal 150 at time $T_{SAMPLE}$ is to sample signal 150 periodically to detect the high to low transitions or state changes of said signal, and classify them as "early" or "late" relative to $T_{SAMPLE}$, where an "early" transition is one that occurs before $T_{SAMPLE}$, and a "late" transition is one that occurs after $T_{SAMPLE}$. This follows from the fact that $T_{SAMPLE}$ is, by definition, the expected crossover point of $V_{AUX}$ with $V_{REF}$, and therefore the expected transition point of binary output signal 150. As illustrated in FIGS. 5A–B, a high to low transition of output signal 150 corresponds to $V_{AUX}$ crossing $V_{REF}$ from above. FIGS. 5A–B illustrate the "equivalence" between the condition in which $V_{AUX}$ crosses $V_{REF}$ "early" (relative to $T_{SAMPLE}$) and the condition in which binary output signal 150 is "low" at $T_{SAMPLE}$. Similarly, the condition in which $V_{AUX}$ crosses $V_{REF}$ "late" (or not at all) corresponds to the condition in which binary output signal 150 is "high" at $T_{SAMPLE}$.

Figure 11:
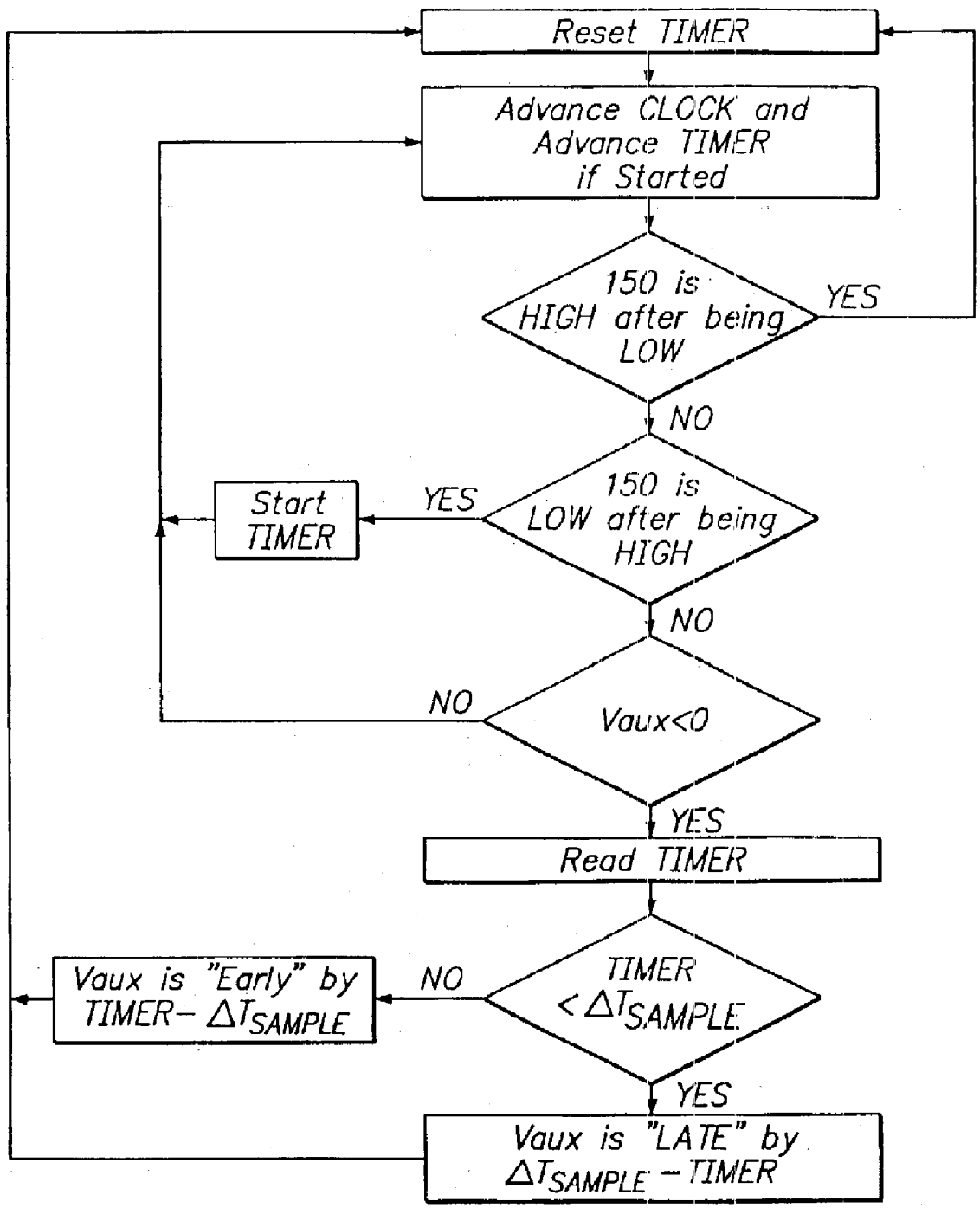
FIG. 11 is a logical flowchart of a signed digital early/late detector employed in embodiments of the invention.

An early/late detector can be more or less sophisticated, depending on the amount of information required to insure acceptable regulation. Perhaps the simplest of early/late detectors is the binary detector, which indicates early or late, relative to $T_{SAMPLE}$. Slightly more sophisticated is the ternary detector, which indicates early or late or neither, when the magnitude of the earliness or lateness is less than some fixed interval of time. A still more sophisticated early/late detector is a signed digital detector, which provides an early or late indication and, in addition, the magnitude of the earliness or lateness expressed digitally. FIG. 11 details one embodiment of a signed digital early/late detector implemented with binary comparators, counters, a subtractor, and a minimal amount of control logic, obviating the need for an error amplifier and the sample and hold circuitry characteristic of prior art analog systems. In the embodiment of FIG. 11, a transition of binary output signal 150 that occurs at precisely $T_{SAMPLE}$ will be classified (by the detector) as "early' by zero units of time.

A variety of control strategies may be employed to modulate pulse width or frequency based on early/late detection of transitions of binary output signal 150 (relative to $T_{SAMPLE}$). These control strategies have as their primary objective, the determination of the duty cycle required to regulate the output voltage. Accordingly, they may be viewed as search strategies, exemplified by linear search, binary search, Newton-Raphson search, etc.

Figures 13A, 13B:
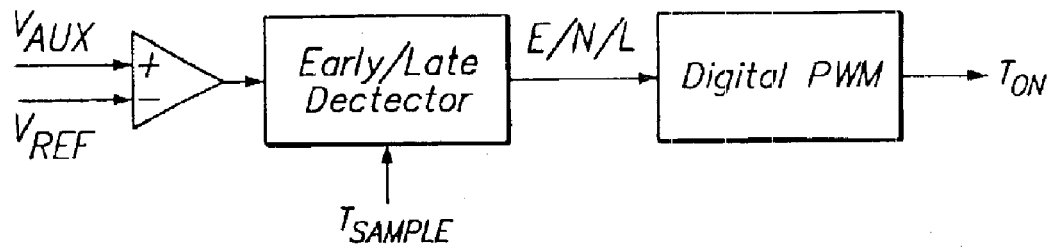
FIGS. 13A–B describe the operation of a pulse modulating controller implementing a ternary early/late detector according to another embodiment of the invention.

FIGS. 13A–B illustrate a fixed step linear search strategy, implemented with a ternary early/late detector. The ON TIME of the nth pulse is denoted by $T_{ON}(n)$. In response to an early indication from the ternary detector, pulse modulating controller 70 widens the next power pulse (relative to the previous power pulse) so as to increase the power transferred to the load 24 to maintain regulation. The widening procedure amounts to increasing the pulse width (relative to the width of the previous pulse) by a fixed increment, $T_{DELTA}$, subject to the maximum pulse width constraint. In response to a late indication from the ternary detector, pulse modulating controller 70 narrows the next power pulse (relative to the previous power pulse) so as to reduce the power transferred to load 24 to maintain regulation.

The narrowing procedure, in this case, amounts to decreasing the pulse width (relative to the width of the previous pulse) by a fixed increment, $T_{DELTA}$, subject to the minimum pulse width constraint. When the indication from the ternary detector is neither, pulse modulating controller 70 leaves the width of the next power pulse unchanged (relative to the previous power pulse). In this fashion, the search converges on the value of $T_{ON}$ required for regulation, and the output voltage $V_{out}$ across load 24 will be determined through the value of $V_{REF}$.

Figures 14A, 14B:
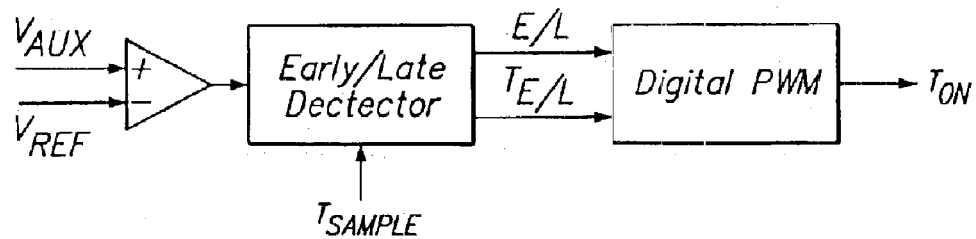
FIGS. 14A–B describe the operation of a pulse modulating controller implementing a signed digital early/late detector according to yet another embodiment of the invention.

FIGS. 14A–B illustrate a proportional step search strategy implemented with a signed digital early/late detector. In this case, pulse modulating controller 70 increases or decreases the power pulse width (relative to the previous power pulse) by an amount proportional (through the scale factor, k) to the earliness or lateness, denoted by $T_{E/L}$. The foregoing strategies are non-limiting examples of the invention disclosed herein;

Minimum power pulses play an important role in the output voltage regulation scheme. Since output voltage feedback is based on the reflected voltage across the transformer T1, a power pulse (of some size) must be sent in order for a sample of the output voltage to be obtained. The more frequently the output is sampled, the better the regulation and the better the response to step changes in load. Accordingly, the minimum pulse and minimum duty cycle constraints of PWM and PFM controls support the objectives of tight regulation and rapid step response.

When load 24 becomes very light or is removed from flyback converter 100 of FIG. 3, the pulse modulating controller 70 would be expected to command a continuous train of minimum power pulses 107 for transmission through power stage 35. Although the energy content of minimum pulses 107 is small, in the absence of load 24 it is possible that the output voltage $V_{out}$ will rise to a level above the desired regulation set point. To maintain good regulation under low-load or no-load conditions, controller 70 may incorporate a "skip mode" of operation, wherein controller 70 inhibits pulsing for short periods.

Controller 70 may detect that a low-load or no-load condition is true by measuring the frequency of minimum power pulses 107 transferred through power stage 35. Alternatively, it may utilize the magnitude information provided by a signed digital comparator or signed digital early/late detector to detect the disappearance (or reappearance) of the load. Once in skip mode, the digital logic in controller 70 intersperses minimum pulses with no pulses, to maintain good regulation with an appropriate level of response to step changes in load without creating excessive audible noise. The process of interspersing minimum pulses could be pseudo-random (e.g., employing a linear feedback shift register).

Figure 6:
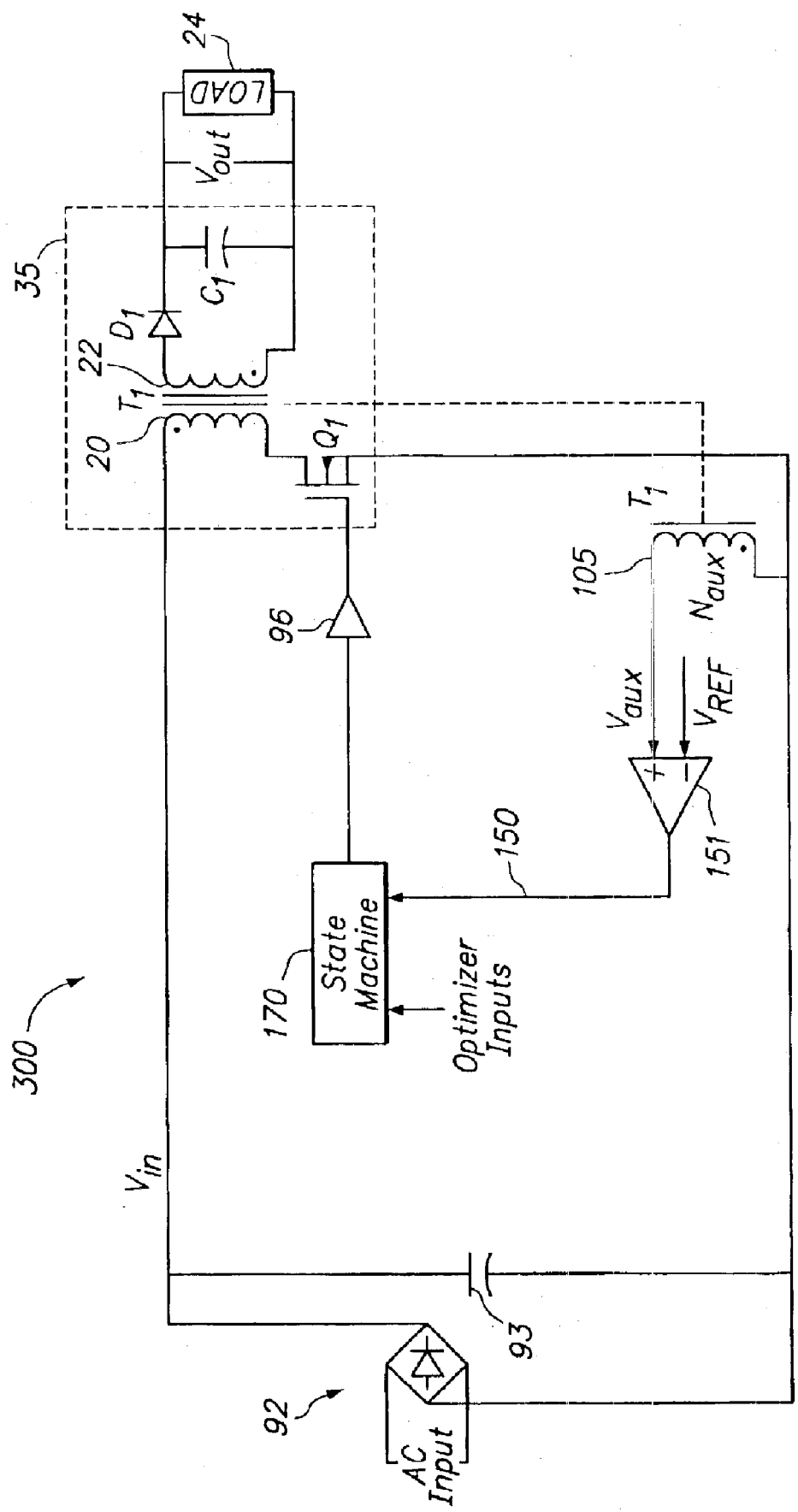
FIG. 6 is a flyback converter with a pulse modulating controller having primary-only feedback according to another embodiment of the invention.

Although shown separately in FIG. 3, it will be appreciated that the pulse optimizer 85 and pulse modulating controller 70 may be implemented as software on a programmable processor, or may be formed by a single component. For example, the flyback converter 300 illustrated in FIG. 6, has the functions of pulse optimization and pulse modulating controller formed by a state machine 170 fed by one or more binary comparators. The state machine 170 may contain a pulse generator (not illustrated) for generating a power pulse drive signal. Pulse timing may be supplied by pulse optimizer logic, and ON TIME and OFF TIME by pulse modulating controller logic. Moreover, should a skip mode be desired, state machine 170 could simply command its pulse generator to not generate a power pulse drive signal.

Although the above discussion has been with respect to a flyback converter 100, it will be appreciated that primary-only feedback methods of the present invention may be implemented in other isolated power converters such as a forward converter.

Figure 7:
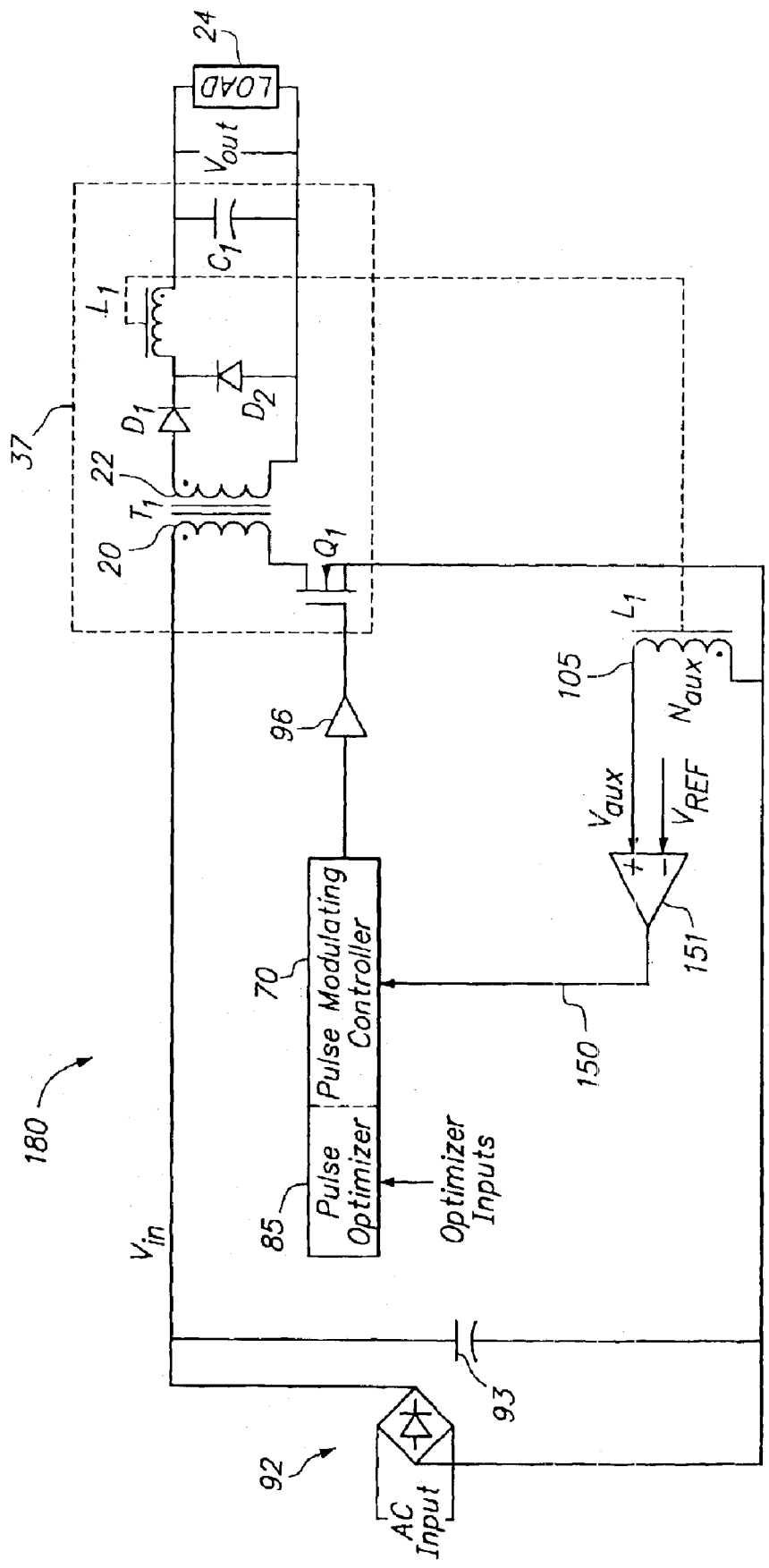
FIG. 7 is a forward converter with a pulse modulating controller having primary-only feedback according to yet another embodiment of the invention.

By way of example, FIG. 7 illustrates a forward converter 180 with a pulse modulating controller 70 using primary-only feedback to control a forward power stage 37. Pulse optimizer 85, comparator 151, pulse modulating controller 70, and driver 96 serve the same functions described previously with respect to the flyback converters of FIGS. 3 and 6. However, the output voltage of forward converter 180 is not reflected across the power transformer T1 (as in flyback converters). Instead, the reflected voltage of the output may be sensed via an auxiliary winding 105 coupled to the output inductor L1. Hence, the reflected voltage across the auxiliary winding 105 ($V_{AUX}$) provides an output voltage feedback signal for input to comparator 151. In this case (as before), the sampling of $V_{AUX}$ would occur at times when the current through the flyback diode is small and constant, sample to sample.

Although shown separately in FIG. 7, it will be appreciated that the pulse optimizer 85 and pulse modulating controller 70 may be implemented as software on a programmable processor, or may be formed by a single component.

Figure 8:
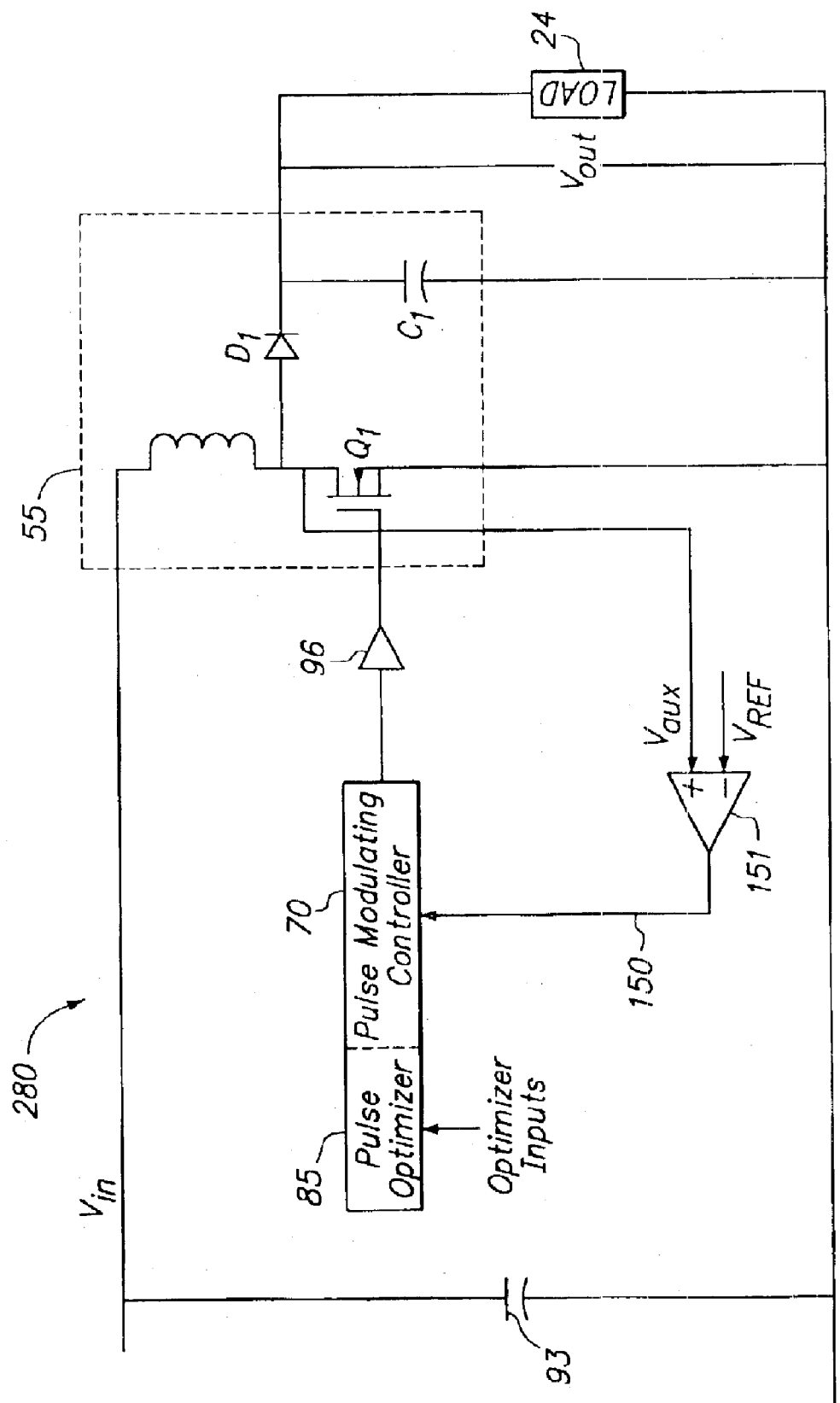
FIG. 8 is a non-isolated boost converter with a pulse modulating controller using primary-only feedback according to still another embodiment of the invention.

The primary-only feedback method disclosed herein may also be extended to direct-coupled switching power converters as well. By way of example, FIG. 8 illustrates a non-isolated boost converter 280 with a pulse modulating controller 70 using primary-only feedback to control a forward power stage 55. While the logic of the pulse optimizer 85 and the pulse modulating controller 70 in converter 280 may be different from that employed in transformer-coupled flyback and forward converters, a primary-only feedback circuits and methods of the present invention may be nevertheless be implemented as shown. In converter 280, the voltage across the switch Q1 during its OFF time provides a suitable approximation to the output voltage when sampled at those precisely determined instants for which the current through the rectifier diode D1 is small and approximately constant, sample to sample (i.e., from switch cycle to switch cycle). While shown separately in FIG. 8, it will be appreciated that the pulse optimizer 85 and pulse modulating controller 70 may be implemented as software on a programmable processor, or may be formed by a single component.

Figure 9:
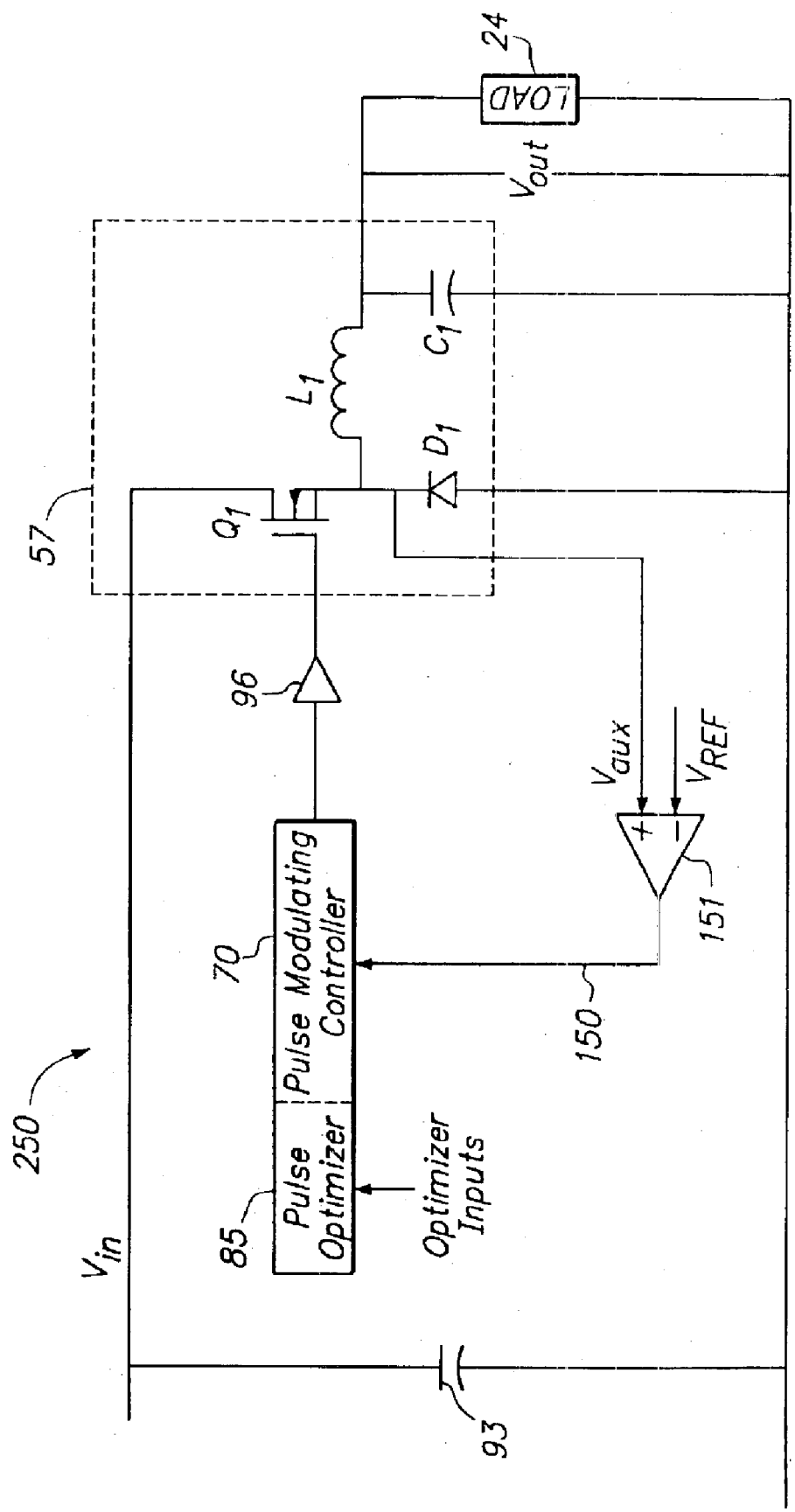
FIG. 9 is a buck converter with a pulse modulating controller using primary-only feedback according to yet another embodiment of the invention.

By way of another example, FIG. 9 illustrates a buck converter 250 with a pulse modulating controller 70 using primary-only feedback to control a forward power stage 57. While the logic of the pulse optimizer 85 and the pulse modulating controller 70 in converter 250 may be different from that employed in transformer-coupled forward and flyback converters, a primary-only feedback method of the present invention may nevertheless be implemented as shown. In converter 250, the differential voltage across the output inductor during the OFF time of the switch Q1 provides a suitable approximation to the output voltage when sampled at those precisely determined instants for which the current through the rectifier diode D1 is small and approximately constant, sample to sample (i.e., switch cycle to switch cycle). Again, while shown separately in FIG. 9, it will be appreciated that the pulse optimizer 85 and pulse modulating controller 70 may be implemented as software on a programmable processor, or may be formed by a single component.

Specific embodiments illustrating various aspects and features of the invention have been shown by way of example in the drawings and are herein described in detail. However, it is to be understood that the invention is not to be limited to the particular embodiments or methods shown or described, but to the contrary, the invention broadly covers all modifications, equivalents, and alternatives encompassed by the scope of the appended claims and their equivalents.

What is claimed:

1. A power converter for delivering power from a source to a load, comprising:
   a switch;
   pulse control circuitry producing a drive signal for cycling the switch ON and OFF, wherein if the switch is cycled ON and OFF according to a cycle of the drive signal, power is transferred from the source to the load; and
   an early/late detector for detecting a crossover time relative to an expected crossover time of an output voltage feedback signal, the pulse control circuitry controlling the turn ON and turn OFF times of the switch in response to an output of the detector.

2. The power converter of claim 1, wherein the detector is one of a binary detector, a ternary detector, and a signed digital detector.

3. The power converter of claim 2, wherein the pulse control circuitry takes into account detector oatputs from one or more previous switch cycles in determining the turn ON and turn OFF times of the switch in response to a present detector output.

4. The power converter of claim 1, wherein the expected crossover time is determined for each cycling of the switch.

5. The power converter of claim 1, wherein the expected crossover time is an instant at which the output voltage feedback signal corresponds to the output voltage plus a small, substantially constant voltage drop measured from cycle to cycle of the switch.

6. The power converter of claim 1, wherein the expected crossover time is an instant at which current flowing through a secondary rectifying element is small and substantially constant from cycle to cycle of the switch.

7. The power converter of claim 1, wherein the converter is a flyback converter having a transformer flux reset point, the output voltage feedback signal is a reflected flyback voltage signal, and the expected crossover time is at a fixed backward offset time from the transformer flux reset point.

8. The power converter of claim 1, wherein the converter is a forward converter having an output inductor, the output voltage feedback signal is a reflected voltage across an auxiliary winding coupled to the output inductor, and the expected crossover time is a fixed backward offset time from a point of output inductor flux reset.

9. The power converter of claim 1, wherein the converter is a direct-coupled boost converter, the output voltage feedback signal corresponds to a voltage across the switch during its OFF time, and the expected crossover time is an instant at which current through a rectifying element is small and substantially constant from cycle to cycle of the switch.

10. The power converter of claim 1, wherein the converter is a direct-coupled buck converter the output voltage feedback signal corresponds to a differential voltage across an output inductor during the OFF time of the switch, and the expected crossover time is at an instant at which current through a rectifying element is small and substantially constant from cycle to cycle of the switch.

* * * * *

UNITED STATES PATENT AND TRADEMARK OFFICE
CERTIFICATE OF CORRECTION

PATENT NO. : 6,862,198 B2
DATED : March 1, 2005
INVENTOR(S) : Mark R. Muegge, Mark Eason and Mark D. Telefus It is certified that error appears in the above-identified patent and that said Letters Patent is hereby corrected as shown below:

Column 12,
Line 18, please replace "oatputs" with -- outputs --.

Signed and Sealed this

Seventeenth Day of May, 2005

JON W. DUDAS
*Director of the United States Patent and Trademark Office*